United States Patent [19]

Grayson

[11] Patent Number: 4,482,456
[45] Date of Patent: Nov. 13, 1984

[54] REVERSE OSMOSIS LIQUID TREATING APPARATUS

[75] Inventor: John R. Grayson, Inverness, Ill.

[73] Assignee: RainSoft Water Conditioning Company, Elk Grove Village, Ill.

[21] Appl. No.: 416,953

[22] Filed: Sep. 13, 1982

[51] Int. Cl.³ .............................................. B01D 31/00
[52] U.S. Cl. .................. 210/134; 210/257.2; 210/433.2
[58] Field of Search ................. 210/134, 257.2, 433.2, 210/34.1, 181, 186

[56] References Cited

U.S. PATENT DOCUMENTS 4,176,063 11/1979 Tyler ............................ 210/257.2 X Primary Examiner—Frank Spear
Attorney, Agent, or Firm—Emrich & Dithmar

[57] ABSTRACT

A multiple purpose tank has an inlet-outlet port, an inlet port and an outlet port connected to a drain. A flexible liquid-proof liner in the tank is connected to the inlet-outlet port to form a variable volume container. Automatic valve means controls the flow of effluent-untreated liquid to the drain and the pressure of effluent-untreated liquid in the tank on the liner and the variable volume container formed thereby. A reverse osmosis module has an inlet port for connection to a pressurized source of untreated liquid and an outlet port connected to the inlet port of the tank. The module has an outlet port connected to the inletoutlet port of the tank to discharge treated liquid to the interior of the tank. A manually actuated control valve controls the flow of effluent-untreated liquid to the tank.

7 Claims, 1 Drawing Figure

U.S. Patent   Nov. 13, 1984   4,482,456
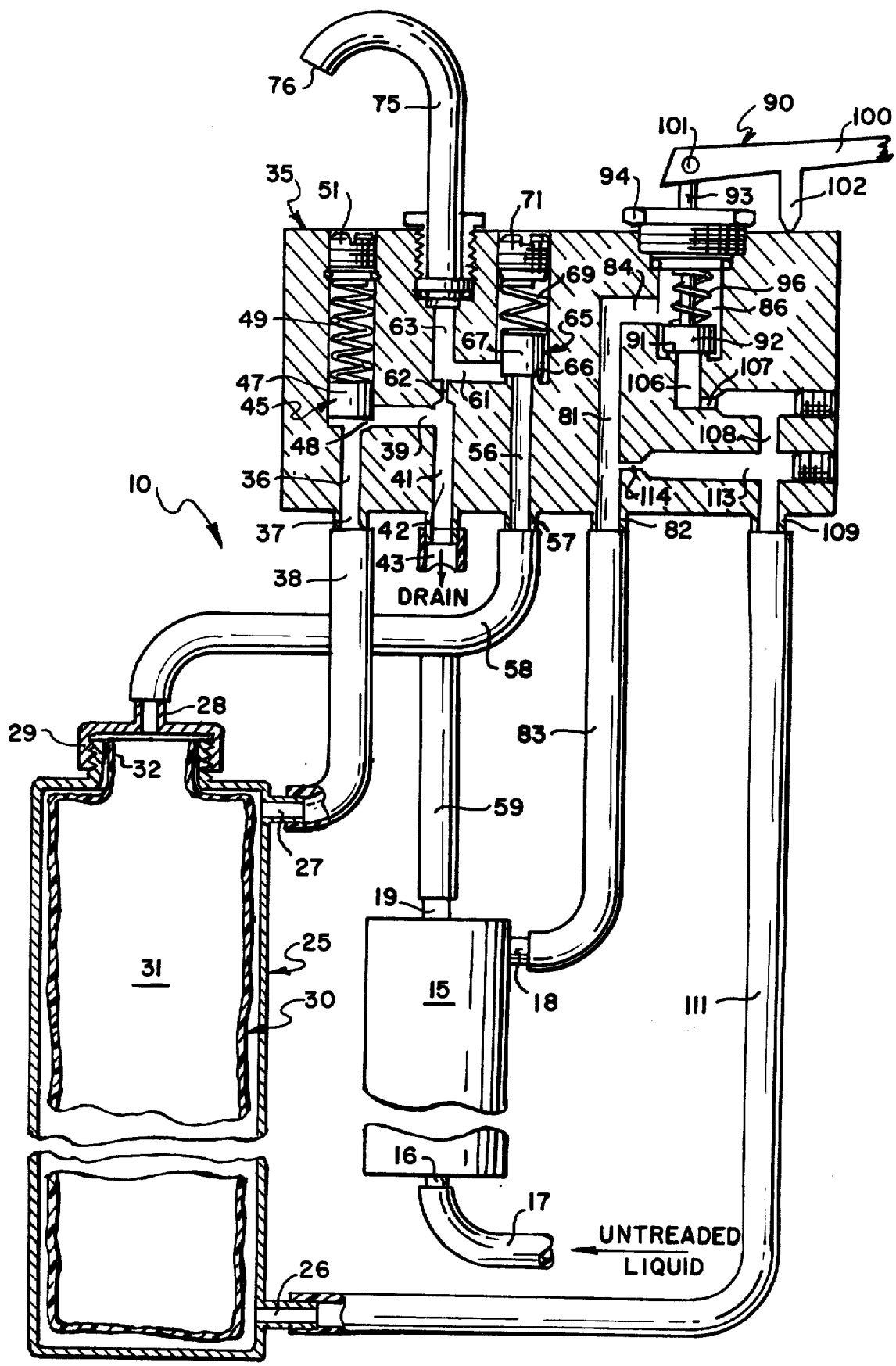

REVERSE OSMOSIS LIQUID TREATING APPARATUS

BACKGROUND OF THE INVENTION

Reverse osmosis is a process useful for desalinization of seawater as well as treating other liquids and is a process in which a pressure gradient across a semipermeable membrane can force water from an aqueous solution through the semipermeable membrane leaving a more concentrated effluent on one side of the membrane. The pressure required to overcome the osmotic pressure of the solution depends on the salts in the solution and hence becomes greater as the solution becomes more concentrated on the one side of the membrane. For seawater, a pressure typically in the range of from about 600 to about 1,000 psi is necessary to effect the reverse osmosis process. For solutions other than seawater, a different pressure gradient across the membrane will be required, all as is well known in the art.

An increasing use has developed in home, factory and office for units providing purified water from ordinary tapwater which may be hard water or well water, making use of a reverse osmosis filter. These filters produce purified water which is good for drinking or other purposes, as well as a larger quantity of effluent containing a higher concentration of impurities or contaminants than the incoming water. Because of the slow rate of flow of purified water through these filters, the purifying system may include storage tanks to retain the purified water and controls for directing the purified water to and from the tanks. Many of these designs are bulky and expensive.

SUMMARY OF THE INVENTION

Accordingly, it is the principal object of the invention to provide a compact and inexpensive apparatus for treating a liquid by the reverse osmosis process wherein the treated liquid is accumulated and chilled prior to dispensing, and the reverse osmosis module is automatically periodically flushed to clean the membrane.

It is another object of the present invention to provide reverse osmosis liquid treating apparatus, comprising: a multiple purpose tank having a treated liquid inlet-outlet port and an effluent-untreated liquid inlet port and an effluent-untreated liquid outlet port connected to a drain; a flexible liquid-proof liner in the tank cooperating with the treated liquid inlet-outlet port of the tank to form a variable volume container for treated liquid; valve means intermediate the effluent-untreated liquid outlet port of the tank and the drain for controlling the flow of effluent to the drain and the pressure of effluent in the tank on the liner and the variable volume container formed thereby; a reverse osmosis module having an untreated liquid inlet port for connection to a pressurized source of untreated liquid and an effluent-untreated liquid outlet port and a treated liquid outlet port connected to the treated liquid inlet-outlet port of the tank to discharge treated liquid to the interior of the variable volume container; and a control valve intermediate the effluent-untreated liquid outlet port of the module and the effluent-untreated liquid inlet port of the tank for controlling the flow of effluent-untreated liquid to the tank, the control valve normally permitting a controlled amount of effluent to flow to the tank and thence to the drain such that treated liquid can accumulate in the variable volume container to the full volume thereof, actuation of the control valve causing pressurized untreated liquid to flow through the module and into the tank thereby increasing the pressure on the variable volume container in the tank to reduce the volume thereof thereby discharging treated liquid therefrom through the inlet-outlet port of the tank while simultaneously directing untreated liquid from the module to the drain to effect fast flushing of the module to enhance the treating action of the module and prolong module life.

Yet another object of the present invention is to provide reverse osmosis liquid treating apparatus, comprising: a multiple purpose tank having a treated liquid inlet-outlet port and an effluent-untreated liquid inlet port and an effluent-untreated liquid outlet port connected to a drain; a flexible liquid-proof liner in the tank connected to the treated liquid inlet-outlet port of the tank to form a variable volume container for treated liquid free of connection to the tank along most of the surface thereof; automatic valve means intermediate the effluent-untreated liquid outlet port of the tank and the drain for controlling the flow of effluent-untreated liquid to the drain and the pressure of effluent-untreated liquid in the tank on the liner and the variable volume container formed thereby; a reverse osmosis module having an untreated liquid inlet port for connection to a pressurized source of untreated liquid and an effluent-untreated liquid outlet port connected to the untreated liquid inlet port of the tank and a treated liquid outlet port connected to the treated liquid inlet-outlet port of the tank to discharge treated liquid to the interior of the tank; and a manually actuated control valve intermediate the effluent-untreated liquid outlet port of the module and the effluent-untreated liquid inlet port of the tank for controlling the flow of effluent-untreated liquid to the tank, the control valve at steady-state conditions permitting a controlled amount of effluent to flow to the tank and thence to the drain such that the flow of effluent into the tank is substantially equal to the flow of effluent to the drain whereby treated liquid can accumulate in the variable volume container to the full volume thereof, the treated liquid in the variable volume container being cooled as effluent contacts most of the surface of the container and flows through the tank to the drain, actuation of the manually actuated control valve causing pressurized untreated liquid to flow through the module and into the tank at a flow rate in excess of the steady-state flow rate thereby increasing the pressure on the variable volume container in the tank to reduce the volume thereof thereby discharging treated liquid therefrom through the inlet-outlet port of the tank while simultaneously directing untreated liquid from the module to the drain to effect fast flushing of the module to enhance the treating action of the module and prolong module life.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWING

For the purpose of facilitating an understanding of the invention, there is illustrated in the accompanying drawing a preferred embodiment thereof, from an inspection of which, when considered in connection with the following description, the invention, its construction and operation, and many of its advantages should be readily understood and appreciated.

The drawing is a side elevational view partly in section of a reverse osmotic treating apparatus incorporating the features of the invention.

DESCRIPTION OF THE PREFERRED EMBODIMENT

Referring now to the drawing, there is illustrated a reverse osmosis liquid treating apparatus 10 including a reverse osmosis module 15 having the traditional reverse osmosis filter therein (not shown). The reverse osmosis module 15 is provided with an untreated liquid inlet port 16 connected by line 17 to a source of pressurized untreated liquid. The reverse osmosis module 15 also has an effluent-untreated liquid outlet port 18 and a treated liquid outlet port 19.

A multi-purpose tank 25, generally cyclindrical in shape, has an effluent-untreated liquid inlet port 26, an effluent-untreated liquid outlet port 27 and a treated liquid inlet-outlet port 28 positioned at the tank top 29. A flexible liquid-proof liner 30 forming a variable volume container 31 is connected to the top 29 of the multi-purpose tank 25 only at the liner top 32, as for instance by adhesive, for a purpose hereinafter set forth.

A control valve housing 35 has a passage 36 therein leading to a port 37 exterior of the valve housing 35 connected by a line 38 to the effluent-untreated liquid outlet port 27 of the multi-purpose tank 25. Connected to the passage 36 in the valve housing 35 is a passage leg 39 connecting the passage 36 with a passage 41 leading to a drain port 42 exterior of the valve housing 35 connected to a drain 43. A valve 45 is located in the valve housing 35 and has a seat 46 located at the juncture of the passage 36 and the leg 39. The valve 45 also has a valve head 47 constructed to sit on the valve seat 46 and to define with the leg 39 a notch passage 48. A spring 49 urges the valve head 47 toward the valve seat 46 and the tension of the spring 49 is controlled by the tension adjusting screw 51 threadedly received in the valve housing 35.

The valve housing 35 further has a passage 56 leading to a port 57 exterior of the valve housing 35. The port 57 is connected by a line 58 to the treated liquid inlet-outlet port 28 of the multi-purpose tank 25 and by a branch line 59 extending from the line 58 to the treated liquid outlet port 19 of the reverse osmosis module 15. The passage 56 is in fluid communication with a leg 61 which leads to a passage 63 in general vertical alignment with the passage 41, but spaced therefrom and connected thereto by a passage 62 of restricted cross sectional area.

A valve 65 is located in the valve housing 35 and includes a valve seat 66 at the juncture of the passages 56 and 61. A valve head 67 is constructed to be sealingly received on the valve seat 66 and is continually urged toward the valve seat 66 by a spring 69, the tension of which is controlled by the tension adjusting screw 71 threadedly received in the valve housing 35. The passage 63 leads from leg 61 and valve 65 to a spout 75 mounted in the valve housing 35, which spout extends exteriorly of the valve housing and terminates in a discharge end 76.

The valve housing 35 has a passageway 81 leading to a port 82 exterior of the valve housing 35, the port 82 being connected by a line 83 to the effluent-untreated liquid outlet port 18 of the reverse osmosis module 15.

The passage 81 is in fluid communication with a passage 84 which leads to an enlarged chamber 86 in the valve housing 35. A manually operated control valve 90 has the seat 91 thereof formed in the bottom of the chamber 86, the valve head 92 thereof constructed to be sealingly received on the seat 91 and connected to a valve rod 93. The valve rod 93 extends through a valve cap 94 threadedly received in the valve housing 35. A spring 96 surrounds the valve rod 93 and is trapped between the valve head 92 and the bottom of the valve cap 94 and continually urges the valve head toward the valve seat. A handle 100 is connected to the valve rod 93 by a pivot pin 101 and has a fulcrum 102 which bears against the top of the valve housing 35.

The valve housing 35 has a passageway 106 in communication with the chamber 86 and a passage 107 of restricted cross sectional area in fluid communication with a passage 108 which communicates with a port 109 exterior of the valve housing 35. The port 109 is connected by a line 111 to the effluent-untreated liquid inlet port 26 of the multi-purpose tank 25. A passage 113 connects the passage 108 and hence the port 109 with the passage 81 by a passage 114 of restricted cross sectional area, for a purpose hereinafter explained.

In operation, the reverse osmosis liquid treating apparatus 10 is connected through line 17 to a source of untreated liquid such as salt water, well water, hard water or the like. At start-up, the control valve 90 is in the illustrated position wherein the valve head 92 is in contact with the valve seat 91 and urged to that position by the spring 96 such that there is no fluid communication between the chamber 86 and the passage 106. As untreated liquid flows into the reverse osmosis module 15 a pressure gradient across the membrane (not shown) is established because of the restricted passage 114 and causes liquid to be driven through the membrane and to exit the reverse osmosis module 15 through the treated liquid outlet port 19 thereof along lines 59, 58 to the treated liquid inlet-outlet port 28 of the multi-purpose tank 25. Inside the tank 25 is the liquid-proof flexible liner 30 in the form of a variable volume container 31 connected at the top 32 thereof to the top 29 of the tank 25, thereby leaving substantially the entire outer surface of the variable volume container 31 free of the walls of the multi-purpose tank 25. As treated liquid enters the container 31 through the port 28, the container increases its volume as the treated liquid accumulates therein. At steady state conditions, treated liquid will eventually fill the entire container 31 and therefter fill the line 58 and then the treated liquid will flow through the port 57 into the passage 56 and bear against the valve head 67 of the valve 65.

The tension of the spring 69 against the valve head 67 can be adjusted by means of the tension adjusting screw 71 to vary the resistance of the valve head 67 to the flow of treated liquid through the valve 65. Increasing the pressure on the valve head 67 causes pressure to increase in the reverse osmosis module on the treated liquid side of the filter, whereas lessening the pressure on the valve head 67 allows the treated liquid to move the head off the valve seat 66 to flow through the leg 61, through the restricted passage 62 to the drain 43. Control of the tension in the spring 69 permits control of the rate of the reverse osmosis process in the module 15. If the tension in the spring 69 is sufficient, the pressure build-up on the treated liquid side of the reverse osmosis membrane will prevent further filtration from occuring. On the other hand, if the tension in the spring 69 is lessened, then even after the container 31, and passage 56 is filled, reverse osmosis will continue but at a rate reduced by the increased pressure on the treated liquid side of the membrane.

During steady state conditions, effluent from the reverse osmosis module 15 leaves the module through the port 18 and is connected to the control valve 90 by means of the line 83, the port 82 and the passage 81. Because the valve 90 has the valve head 92 firmly seated on the valve seat 91 due to the spring 96, effluent from the reverse osmosis module 15 is forced through the restricted passage 114, passage 113 into the passage 108 and through the port 109 into the line 111. Thereafter, the effluent travels to the multi-purpose tank 25 and enters same through the effluent-untreated liquid inlet port 26. When the effluent enters the tank 25, it occupies the space between the outer surface of the variable volume container 31 and the inner surface of the tank 25. The effluent travels upwardly through the tank 25 from the effluent-untreated liquid inlet port 26 to the effluent-untreated liquid outlet port 27. The effluent contacts almost the entire outer surface of the variable volume container 31 continuously to cool the treated liquid inside the container 31 during the passage of the effluent from the port 26 to the port 27. Effluent when it leaves the tank 25 through the port 27 is conducted through line 38, port 37 and passage 36 to the valve 45 where the effluent passes through the notch 48, leg passage 39, passage 41 to the drain 43.

At steady state conditions, the flow rate of the fluid through the restricted passageway 114 is equal to the flow rate of effluent through the notch 48, thereby to prevent pressure build-up in the tank 25 which would serve to constrict or limit the volume of the variable volume container 31. At steady state conditions, the variable volume container 31 is allowed to expand to its full volume and to accumulate the maximum volume of treated liquid therein, all the time being continuously cooled by the passage of the effluent-untreated liquid through the tank 25, as herebefore described.

Treated fluid is dispensed from the reverse osmosis liquid treating apparatus 10 by actuation of the manually actuated control valve 90. Movement of the handle 30 in the clockwise direction causes the valve head 92 to be moved upwardly away from the valve seat 91 causing the spring 96 to be compressed and allowing a substantially greater flow rate of liquid to flow through the effluent-untreated liquid outlet port 18 of the reverse osmosis module 15. Because at steady state conditions, the output flow from the reverse osmosis module 15 is forced through the restricted passage 114, a pressure build-up occurs in the reverse osmosis module 15 which results in the pressure gradient across the membrane. However, when the valve head 92 is moved off of its valve seat 91, a much greater flow rate of liquid is allowed to pass through the reverse osmosis module 15, it being remembered that the source of untreated liquid is under pressure, the pressure gradient across the membrane is drastically reduced, thereby reducing or entirely stopping the production of treated liquid, and principally untreated liquid passes through the module 15 and the effluent-untreated liquid outlet port 18 thereof. This untreated liquid exits through the port 18 and the line 83 into the chamber 86 and hence downwardly through the passage 106, the restricted passage 107, the passage 108, the port 109 and into the line 111. The restricted passage 107 is provided to control the flow rate of untreated liquid into the tank 25 so as to provide a controlled discharge of treated liquid from the variable volume container 31.

As the untreated liquid enters the multi-purpose tank 25 through the effluent-untreated liquid inlet port 26, it exerts an increased pressure on the variable volume container 31 because of the resistance of the spring 49 in the valve 45. The valve 45 is adjusted so that the resistance thereof provided by the spring 49 is greater than the resistance to compressing the variable volume container 31. Therefore, as the untreated liquid enters the tank 25 of the variable volume container 31 is compressed forcing the treated liquid therein upwardly through the treated liquid inlet-outlet port 28, the line 58, the port 57, the passage 56 where it moves the valve head 67 off the valve seat 66 and thence through the passage 61, the passage 63 into the spout 75 and out of the discharge end 76 thereof.

Compression of the variable volume container 31 continues so long as the control valve 90 is open. During this time, untreated liquid in the tank 25 exits the tank through the effluent-untreated liquid outlet port 27 and passes upwardly through line 38 into the valve housing 35 through the port 37 and the passage 36 where it moves the valve head 47 away from the valve seat 46, thereby enlarging the connection between the passage 36 and the passage 39 to allow the larger volume of untreated liquid to flow to the drain 43. These conditions pertain until the treated liquid in the container 31 is exhausted, at which time treated liquid flow through the spout 75 ceases while untreated liquid continues to flow to the drain 43.

After the control valve handle 100 is released, the valve head 92 is again urged by means of the spring 96 to sealingly engage the valve seat 91, at which time steady state conditions resume wherein pressure builds up in the reverse osmosis module 15 to provide a pressure gradient sufficient to cause reverse osmosis to occur across the membrane thereby producing treated liquid which exits the module 15 through the treated liquid outlet port 19. Effluent produced during the reverse osmosis process exits the module 15 through the effluent-untreated liquid outlet 18 into the line 83, the port 82, the passage 81 through the restricted passage 114 and thence into the multi-purpose tank 25 through the effluent-untreated liquid inlet port 26 thereof. At this time, the valve 45 is in the illustrated condition wherein the valve head 47 is in contact with the valve seat 46. The valve 65 is in the illustrated position wherein the valve head 67 is sealingly engaged with the valve seat 66. Treated liquid again accumulates in the variable volume container 31 thereby increasing the volume of same, while the treated liquid is being continually cooled by the passage of effluent through the tank 25 from the effluent-untreated liquid inlet 26 to the effluent-untreated outlet 27.

During the dispensing of the treated liquid from the spout 75, a substantially increased flow of untreated liquid passes through the reverse osmosis module 15 resulting in the fast flushing of the membrane thereby automatically cleansing the membrane which enhances the treating action of the membrane for the next cycle and prolongs the life of the membrane and hence the module 15. The invention provides both fast flushing of the reverse osmosis module 15 on a regular periodic basis (during every dispensing operation) and provides continuously cooled treated liquid without the necessity of expensive cooling coils or other refrigerant-type apparatus.

While there has been described what at present is considered to be the preferred embodiment of the present invention, it will be understood that various modifications and alterations may be made therein without departing from the true spirit and scope of the invention and it is intended to cover in the claims appended hereto all such modifications and alterations.

I claim:

1. Reverse osmosis liquid treating apparatus, comprising: a multiple purpose tank having a treated liquid inlet-outlet port and an effluent-untreated liquid inlet port and an effluent-untreated liquid outlet port connected to a drain; a flexible liquid-proof liner in said tank connected to said treated liquid inlet-outlet port of said tank to form a variable volume container for treated liquid free of connection to said tank along most of the surface thereof; automatic valve means intermediate said effluent-untreated liquid outlet port of said tank and said drain for controlling the flow of effluent-untreated liquid to the drain and the pressure of effluent-untreated liquid in said tank on said liner and said variable volume container formed thereby; a reverse osmosis module having an untreated liquid inlet port for connection to a pressurized source of untreated liquid and an effluent-untreated liquid outlet port connected to the untreated liquid inlet port of said tank and a treated liquid outlet port connected to said treated liquid inlet-outlet port of said tank to discharge treated liquid to the interior of said tank; and a manually actuated control valve intermediate said effluent-untreated liquid outlet port of said module and said effluent-untreated liquid inlet port of said tank for controlling the flow of effluent-untreated liquid to said tank, said control valve at steady-state conditions permitting a controlled amount of effluent to flow to said tank and thence to said drain such that the flow of effluent into said tank is substantially equal to the flow of effluent to said drain whereby treated liquid can accumulate in said variable volume container to the full volume thereof, the treated liquid in said varible volume container being cooled as effluent contacts most of the surface of said container and flows through said tank to said drain, actuation of said manually actuated control valve causing pressurized untreated liquid to flow through said module and into said tank at a flow rate in excess of the steady-state flow rate thereby increasing the pressure on said variable volume container in said tank to reduce the volume thereof thereby discharging treated liquid therefrom through the inlet-outlet port of said tank while simultaneously directing untreated liquid from said module to said drain to effect fast flushing of said module to enhance the treating action of said module and prolong module life.

2. The reverse osmosis liquid treating apparatus of claim 1, and further comprising a spout connected to the treated liquid inlet-outlet port of said tank for dispensing treated liquid.

3. The reverse osmosis liquid treating apparatus of claim 2, and further including a restricted passage between said spout and said drain to accommodate excess treated liquid.

4. The reverse osmosis liquid treating apparatus of claim 1, wherein said automatic valve means is spring biased to allow the flow of effluent from said tank to said drain to be equal to the flow of effluent from said module through said control valve.

5. The reverse osmosis liquid treating apparatus of claim 1, wherein said control valve includes a movable valve and a fixed valve, said movable valve being located between said module effluent-untreated liquid outlet port and said tank effluent-untreated liquid inlet port, said fixed valve being a restricted passage connecting said module effluent-untreated liquid outlet port and said effluent-untreated liquid inlet port of said tank, said restricted passage being positioned between said effluent-untreated liquid outlet port of said module and said movable valve.

6. The reverse osmosis liquid treating apparatus of claim 5, and further comprising flow reducing means between said movable valve and said effluent-untreated liquid inlet port of said tank to control the flow of untreated liquid to said tank during actuation of said control valve.

7. The reverse osmosis liquid treating apparatus of claim 1, wherein said liner is connected to said tank only at the top thereof to provide maximum surface contact between said liner and the effluent flowing through said tank during steady-state conditions from said effluent-untreated liquid inlet port to said effluent-untreated liquid outlet port to enhance cooling of the treated liquid.

* * * * *